United States Patent [19]
Moro et al.

[11] Patent Number: 5,229,219
[45] Date of Patent: Jul. 20, 1993

[54] MAGNETIC RECORDING MEDIUM COMPRISING A MAGNETIC LAYER CONTAINING A SPECIFIED MAGNETIC FERRITE POWDER AND HAVING A CURIE TEMPERATURE UP TO 180° C.

[75] Inventors: Hideharu Moro, Funabashi; Shigeo Satoh, Chiba; Osamu Kohmoto, Ichikawa; Tetsuhito Yoneyama, Narashino; Shohei Mimura, Tokyo; Haruyuki Takahashi, Ebina; Atsushi Makimura, Sagamihara, all of Japan

[73] Assignee: TDK Corporation, Tokyo, Japan

[21] Appl. No.: 536,661

[22] PCT Filed: Nov. 2, 1989

[86] PCT No.: PCT/JP89/01133
§ 371 Date: Jul. 9, 1990
§ 102(e) Date: Jul. 9, 1990

[87] PCT Pub. No.: WO90/05367
PCT Pub. Date: May 17, 1990

[30] Foreign Application Priority Data

Nov. 8, 1988 [JP] Japan .................. 63-281679
Jun. 7, 1989 [JP] Japan .................. 1-144709
Oct. 6, 1989 [JP] Japan .................. 1-262377

[51] Int. Cl.$^5$ ............................. G11B 5/00
[52] U.S. Cl. ...................... 428/694; 428/403; 428/900; 252/62.54; 360/17; 360/59
[58] Field of Search ............ 428/694, 900, 403; 360/17, 59; 252/62.54

[56] References Cited
U.S. PATENT DOCUMENTS

| | | | |
|---|---|---|---|
| 3,838,450 | 9/1974 | Bongers et al. | 360/59 |
| 4,404,254 | 9/1983 | Franz et al. | 428/329 |
| 4,543,198 | 9/1985 | Kamiyama | 252/62.59 |
| 4,615,944 | 10/1986 | Gardner | 428/332 |
| 4,720,411 | 1/1988 | Shimozawa et al. | 428/141 |
| 4,778,734 | 10/1988 | Ohdan et al. | 428/694 |
| 4,839,226 | 6/1989 | Sawada et al. | 428/336 |

FOREIGN PATENT DOCUMENTS 3537624 4/1987 Fed. Rep. of Germany .

Primary Examiner—Paul Thibodeau
Assistant Examiner—Stevan A. Resan
Attorney, Agent, or Firm—Oblon, Spivak, McClelland, Maier & Neustadt

[57] ABSTRACT

According to the invention, a magnetic recording medium is formed by using magnetic powder having a composition of the following formula:

$$MeO \cdot n[Fe_{2-x-y-z}Ga_xCr_yAl_zO_3]$$

wherein Me is at least on element selected from the group consisting of Ba, Sr, Pb, and Ca, $4.5 \leq n \leq 6$, $x \geq 0$, $y \geq 0$, $z \geq 0$, $x/3 + y/4 + z/6 \geq 1/6$, and $x/6 + y/10 + z/11 \leq 1/6$, preferably the number of those particles having a particle size of from $0.5\bar{d}$ to $1.5\bar{d}$ being at least 65% of the entire particles wherein is an average particle size, and the Fe content on the particle surface being substantially equal to the Fe content in the particle interior, and blending the powder with a binder. Thermomagnetic recording and thermomagnetic duplication are carried out using the medium. There results a magnetic layer which has high Hc, is not easily erased once recorded, has high squareness ratio, and enables thermomagnetic recording and thermomagnetic duplication at 100° to 180° C. with outputs having an excellent frequency response and minimized variation and noise.

8 Claims, 3 Drawing Sheets

MAGNETIC RECORDING MEDIUM COMPRISING A MAGNETIC LAYER CONTAINING A SPECIFIED MAGNETIC FERRITE POWDER AND HAVING A CURIE TEMPERATURE UP TO 180° C.

FIELD OF THE INVENTION

This invention relates to a magnetic powder, a method for preparing the magnetic powder, a magnetic recording medium using the magnetic powder, and a magnetic recording method using the medium.

BACKGROUND OF THE INVENTION

Known contact duplication for magnetic tape is a thermal duplication method (see the Japan Electronic Communications Society, 1971 National Meeting, S9-7 and IEEE Transaction on Magnetics, Vol. MAG-20, No. 1, January 1984, p19-23, for example).

The thermal duplication method is to duplicate signals through thermal duplication by using a master tape in the form of a $\gamma$-$Fe_2O_3$ tape or the like, and moving the master tape and a $CrO_2$ tape in mutual contact at a high speed, while heating at about 150° C.

However, since the prior art $CrO_2$ tape has no flat frequency response to duplication signals, the master tape must be recorded with emphasis.

Also, the $CrO_2$ tape is inconvenient to handle in that it can be erased with conventional magnetic heads because $CrO_2$ particles have a coercive force Hc as low as 0.4 to 0.7 kOe.

In turn, known high coercive force materials having a low Curie point include magnetic alloy particles such as MnBi.

In order to provide a high coercive force, these alloy materials, however, must have a Curie point of about 300° C. or higher, which requires a higher heating temperature with the risk that the substrate can be thermally deformed and an output with deteriorated waveform will result.

Because of a low squareness ratio and a broad thermal demagnetization curve, the output varies with the varying temperature of the heating head. In addition, noises frequently occur and an output S/N ratio is low.

In addition, corrosion resistance and weathering resistance are insufficient.

DISCLOSURE OF THE INVENTION

A first object of the present invention is to provide a magnetic recording medium which requires a low heating temperature, is easy for thermomagnetic duplication recording and thermomagnetic recording, exhibits a flat frequency response upon such recording, is not easily erasable once recorded, produces outputs which least vary with variations in heating temperature and have an improved S/N ratio, and has improved corrosion resistance and weathering resistance, and excellent input/output properties as well as a magnetic recording method using the medium.

A second object of the present invention is to provide a magnetic powder offering better results in implementing such a magnetic recording medium and a method for preparing the powder.

These objects are accomplished by the present invention as defined below.

In a first form of the present invention, there is provided a magnetic powder characterized by comprising particles having a composition of the following formula:

$$MeO \cdot n[Fe_{2-x-y-z}Ga_xCr_yAl_zO_3]$$

wherein Me is at least one element selected from the group consisting of Ba, Sr, Pb, and Ca, $4.5 \leq n \leq 6$, $x \geq 0$, $y \geq 0$, $z \geq 0$,

$x/3 + y/4 + z/6 \geq 1/6$, and $x/6 + y/10 + z/11 \leq 1/6$, wherein the particles have an average particle size $\bar{d}$, and the number of those particles having a particle size of from $0.5\bar{d}$ to $1.5\bar{d}$ is at least 65% of the entire particles.

The magnetic powder is preferably obtained by mechanically milling a corresponding sintered material.

In a second form of the present invention, there is provided a magnetic powder characterized by comprising particles having a composition of the following formula:

$$MeO \cdot n[Fe_{2-x-y-z}Ga_xCr_yAl_zO_3]$$

wherein Me is at least one element selected from the group consisting of Ba, Sr, Pb, and Ca, $4.5 \leq n \leq 6$, $x \geq 0$, $y \geq 0$, $z \geq 0$, $x/3 + y/4 + z/6 \geq 1/6$, and $x/6 + y/10 + z/11 \leq 1/6$, wherein the Fe content on the particle surface is substantially equal to the Fe content in the particle interior.

Preferably, the particles have an average particle size $\bar{d}$, and the number of those particles having a particle size of from $0.5\bar{d}$ to $1.5\bar{d}$ is at least 65% of the entire particles.

Also, the magnetic powder is preferably obtained by mechanically milling a corresponding sintered material.

In a third form of the present invention, there is provided a method for preparing a magnetic powder having a composition of the following formula:

$$MeO \cdot n[Fe_{2-x-y-z}Ga_xCr_yAl_zO_3]$$

wherein Me is at least one element selected from the group consisting of Ba, Sr, Pb, and Ca, $4.5 \leq n \leq 6$, $x \geq 0$, $y \geq 0$, $z \geq 0$, $x/3 + y/4 + z/6 \geq 1/6$, and $x/6 + y/10 + z/11 \leq 1/6$, the method comprising the steps of: injecting a feed powder along with a feed gas into a milling chamber; injecting the feed gas as a high velocity gas flow into the chamber through a gas injection nozzle; and milling the feed powder in the high velocity gas flow in the chamber, or milling the feed powder by forcedly impinging it against an impact plate, thereby obtaining the powder.

In the preferred method for preparing a magnetic powder, the magnetic powder has an average particle size $\bar{d}$, the number of those particles having a particle size of from $0.5\bar{d}$ to $1.5\bar{d}$ is at least 65% of the entire particles, and the Fe content on the particle surface is substantially equal to the Fe content in the particle interior.

In the preferred method for preparing a magnetic powder, the Fe content on the particle surface is substantially equal to the Fe content in the particle interior.

In a fourth form of the present invention, there is provided a method for preparing a magnetic powder having a composition of the following formula:

$$MeO \cdot n[Fe_{2-x-y-z}Ga_xCr_yAl_zO_3]$$

wherein Me is at least one element selected from the group consisting of Ba, Sr, Pb, and Ca, $4.5 \leq n \leq 6$, $x \geq 0$, $y \geq 0$, $z \geq 0$, $x/3 + y/4 + z/6 \geq 1/6$, and $x/6 + y/10 + z/11 \leq 1/6$, the method comprising the steps of: milling a feed powder, and thereafter etching away a surface portion of particles.

In the preferred method for preparing a magnetic powder, the Fe content on the particle surface is substantially equal to the Fe content in the particle interior.

In a fifth form of the present invention, there is provided a magnetic recording medium characterized by comprising a magnetic layer containing a magnetic powder having a composition of the following formula:

$$MeO \cdot n[Fe_{2-x-y-z}Ga_xCr_yAl_zO_3]$$

wherein Me is at least one element selected from the group consisting of Ba, Sr, Pb, and Ca, $4.5 \leq n \leq 6$, $x \geq 0$, $y \geq 0$, $z \geq 0$, $x/3 + y/4 + z/6 \geq 1/6$, and $x/6 + y/10 + z/11 \leq 1/6$, in a binder.

In the preferred magnetic recording medium, the magnetic powder has an average particle size $\bar{d}$, the number of those particles having a particle size of from $0.5\bar{d}$ to $1.5\bar{d}$ is at least 65% of the entire particles.

In the preferred magnetic recording medium, the Fe content on the particle surface is substantially equal to the Fe content in the particle interior.

In a sixth form of the present invention, there is provided a method for thermomagnetic recording on a thermomagnetic recording medium comprising a magnetic layer containing a magnetic powder having a composition of the following formula:

$$MeO \cdot n[Fe_{2-x-y-z}Ga_xCr_yAl_zO_3]$$

wherein Me is at least one element selected from the group consisting of Ba, Sr, Pb, and Ca, $4.5 \leq n \leq 6$, $x \geq 0$, $y \geq 0$, $z \geq 0$, $x/3 + y/4 + z/6 \geq 1/6$, and $x/6 + y/10 + z/11 \leq 1/6$, in a binder, the method comprising the step of carrying out thermomagnetic recording by heating the magnetic layer at 100° to 180° C.

In the preferred thermomagnetic recording method, the magnetic powder has an average particle size $\bar{d}$, the number of those particles having a particle size of from $0.5\bar{d}$ to $1.5\bar{d}$ is at least 65% of the entire particles.

In the preferred thermomagnetic recording method, the Fe content on the particle surface is substantially equal to the Fe content in the particle interior.

In a seventh form of the present invention, there is provided a method for thermomagnetic duplication on a magnetic recording medium comprising a magnetic layer containing a magnetic powder having a composition of the following formula:

$$MeO \cdot n[Fe_{2-x-y-z}Ga_xCr_yAl_zO_3]$$

wherein Me is at least one element selected from the group consisting of Ba, Sr, Pb, and Ca, $4.5 \leq n \leq 6$, $x \geq 0$, $y \geq 0$, $z \geq 0$, $x/3 + y/4 + z/6 \geq 1/6$, and $x/6 + y/10 + z/11 \leq 1/6$, in a binder, the method comprising the step of carrying out thermomagnetic duplication by placing the magnetic layer in contact with another recorded magnetic layer while heating the magnetic layer at 100° to 180° C.

In the preferred thermomagnetic duplication method, the magnetic powder has an average particle size $\bar{d}$, the number of those particles having a particle size of from $0.5\bar{d}$ to $1.5\bar{d}$ is at least 65% of the entire particles.

In the preferred thermomagnetic duplication method, the Fe content on the particle surface is substantially equal to the Fe content in the particle interior.

The magnetic powder of the invention has a coercive force Hc as high as 3 to 12 kOe, and the medium cannot be erased with conventional heads and is thus convenient to handle.

A stable Tc of 100° to 180° C. ensures excellent thermomagnetic duplication and thermomagnetic recording.

The frequency response on thermomagnetic duplication and thermomagnetic recording is very flat.

It shows a high squareness ratio, a minimized output variation, and a high S/N ratio.

The substituted M type ferrite represented by the above-defined formula is known from Funtai oyobi Funmatsu Yakin (Powder and Powder Metallurgy), February 1972, p219; Landolt Bornstein, 1970, Lit. s., 614; and Ferromagnetic Materials, Vol. 3 (Ed. E. P. Wohlfarth, North Holland Pub., 1982), p305-391, for example.

However, these references report only the measured magnetic properties of isotropic sintered materials and surely show a lowering of Curie point Tc, but no example of mechanical pulverization as needed in the present invention.

Of course, the references contain no indication regarding the use of magnetic powder as magnetic recording media in thermomagnetic recording and thermomagnetic duplication, resulting in a flat frequency response and improved input/output properties including output properties with minimal variations and noises.

Further, Japanese Patent Application Kokai No. 164302/1985 discloses that a substituted M type ferrite falling within the composition represented by the above-defined formula is used as thin films for magneto-optical recording media.

It also discloses that Tc is 200° C. or lower, but contains no indication regarding a magnetic powder as defined in the present invention, a medium using the powder, and excellent input/output properties achieved thereby.

BEST MODE FOR CARRYING OUT THE INVENTION

The construction of the present invention will be illustrated in detail.

The magnetic powder used herein is a substituted M type ferrite having a composition represented by the above-defined formula.

In the formula, Me is at least one element selected from the group consisting of Ba, Sr, Pb, and Ca. When Me is a mixture of two or more such elements, the proportion of the respective elements is not critical although inclusion of at least one of Ba and Sr as an essential ingredient and at least one of Pb and Ca as an optional ingredient is preferred.

The substituting element for the M type ferrite is at least one of Ga, Cr, and Al.

Their substitution quantities x, y, and z are as defined previously.

Illustratively, x, y, and z meet the relationships:

$x \geq 0, y \geq 0, z \geq 0,$ $x/3 + y/4 + z/6 \geq 1/6,$ and $x6 + y/10 + z/11 \leq 1/6.$ If $x/3 + y/4 + z/6 < 1/6$, then the Curie point Tc is high, and if $x/6 + y/10 + z/11 > 1/6$, then the saturation magnetization $\sigma s$ is low and Tc is too low to provide practical powder.

Up to 40 atom % of the total of Ga, Cr, and Al may be replaced by at least one element selected from the group consisting of In, Sc, Ti, Zn, Sn, Cr, Ta, Sb, Bi, V, Y, Mn, Co, and Ni.

Letter n is a number of 4.5 to 6, preferably 5 to 6 because n outside the range will result in a lowering of $\sigma s$ and precipitation of $Fe_3O_4$ phase.

The magnetic powder having a composition as defined above is a powder of hexagonal plates having a hexagonal system or fractured particles.

The powder preferably has an average particle size $\bar{d}$ of 0.3 to 3 μm, especially 0.5 to 2 μm, provided that the average particle size $\bar{d}$ is an average (number average) of the maximum diameters of particles in a view when an SEM image of the powder is observed.

If $\bar{d}$ is less than 0.3 μm, then dispersibility becomes poor and a problem will arise in coating uniformity when coated, whereas $\bar{d}$ in excess of 3 μm will result in a substantial loss of Hc.

Figure 1:
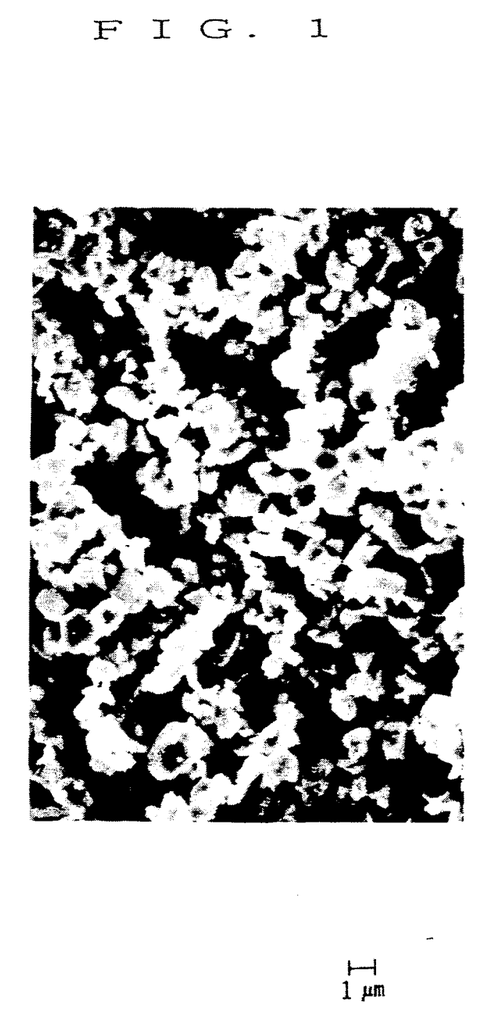
FIG. 1 is a photomicrograph under a scanning electron microscope showing the particle morphology of a magnetic powder according to the present invention.

As seen from FIG. 1, the powder has a sharp curve of particle size distribution.

Preferably, the number of those particles having a particle size of from $0.5\bar{d}$ to $1.5\bar{d}$ is at least 65%, more preferably at least 80% of the entire particles.

With the sharp curve of particle size distribution, in particular, squareness ratio is increased and input/output properties are substantially improved.

It will be understood that the particle size (maximum particle diameter) of particles constituting the powder may be determined by image processing of an SEM image according to well-known methods.

The particle size distribution can be effectively accomplished by jet-mill pulverization as will be described later.

It is to be noted that each particle preferably has an average grain size of the order of 0.3 to 3 μm.

Further preferably, the Fe content Cs on the surface of particles constituting the magnetic powder is substantially equal to the Fe content Ci in the particle interior.

The contents Cs and Ci of particles may be determined by Auger analysis or ESCA while ion etching the particles, Cs being given by the initial Fe count and Ci being given by the Fe count obtained after a predetermined time of ion etching. Preferably, Cs/Ci is in the range of from 0.9 to 1.1.

In preparing the substituted M type ferrite magnetic powder of the invention, vitrifying crystallization techniques, co deposition techniques, metal alkoxide techniques and other suitable techniques may generally be used. For mass production, powder is preferably prepared by mechanically milling sintered material as described below.

First of all, source materials are blended, calcined or pre-sintered, milled, and then sintered.

Thereafter, the sintered material is usually wet milled by means of an attritor or the like, dried, and finally disintegrated, yielding magnetic powder.

The magnetic powder obtained by this procedure, however, has problems of a broad particle size distribution and an insufficient squareness ratio.

Further, Fe and other elements can be introduced into the powder from the milling medium during wet milling, resulting in an increased Tc.

In addition, the magnetic powder tends to vary its properties with varying preparation conditions.

Although the conventional mechanical milling methods allow Fe to be introduced into the particle surface from the milling medium, etching of the particle surface after milling or use of a jet mill for milling can maintain the Cs/Ci within the range of from 0.9 to 1.1 while restraining or avoiding introduction of Fe into the particle surface.

It is therefore preferred to prepare the magnetic powder of the invention as follows.

First, stock materials are prepared, for example, $SrCO_3$, $Al_2O_3$, $Cr_2O_3$, $Ga_2O_3$, $Fe_2O_3$, $BaCO_3$, and PbO in powder form having a particle size of about 0.3 to about 2.0 μm.

They are then blended in a ball mill, attritor or other suitable mill, molded, and calcined or pre-sintered in air at 1,000° to 1,300° C. for about 2 to about 4 hours.

The material is then milled to a particle size of about 2 to 10 μm in a vibratory mill, ball mill, attritor or other suitable mill.

The material is thereafter sintered.

Using an electric furnace, sintering is effected in air at 1,350° to 1,450° C. for about 2 to about 4 hours.

Thereafter, the material is crushed to a size of about 2 to about 5 μm in a vibratory mill or the like, and then milled, preferably in a jet mill.

Figure 2:
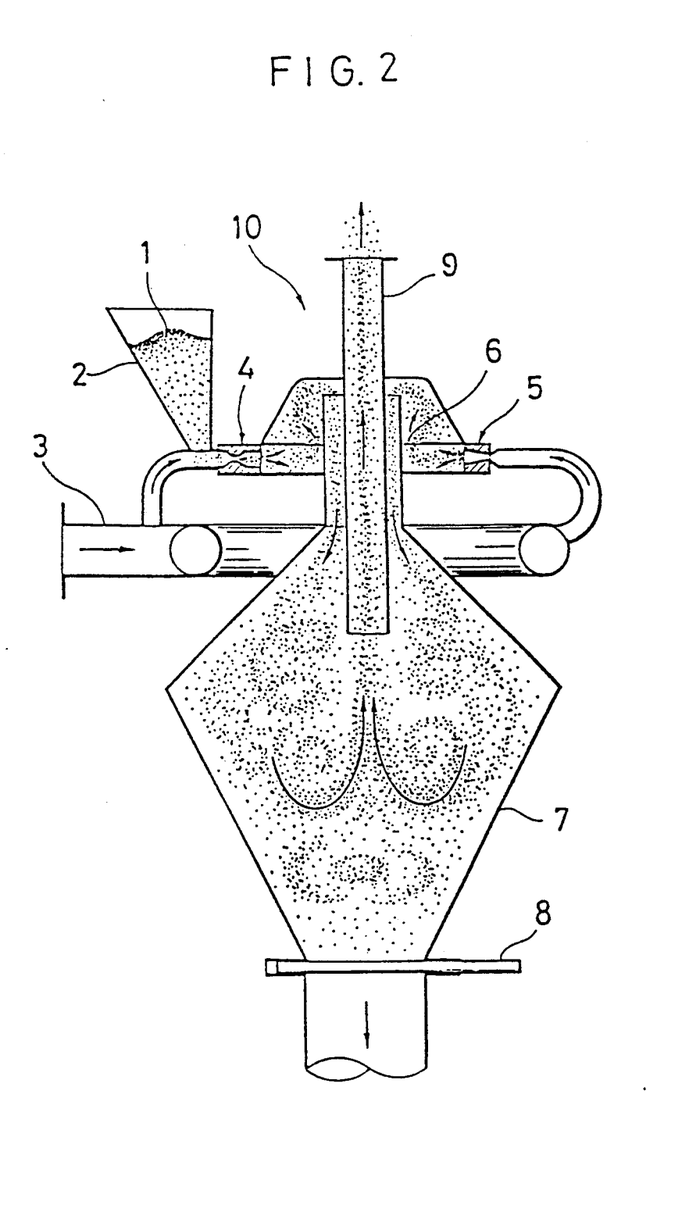
FIGS. 2 and 3 are schematic cross-sectional side views showing jet mills used in the preparation methods of the present invention.

The jet milling may be carried out using a jet mill pulverizing apparatus 10 shown in FIG. 2, for example.

A hopper 2 of the jet mill 10 is charged with a sintered powder 1 in coarse powder form having an average particle size of 2 to 10 μm.

Air is supplied through a gas inlet 3 to carry the sintered powder 1 from the hopper 2 into a milling chamber 6 at a supersonic velocity through a feed nozzle 4.

The feed gas is supplied at a flow velocity of about 500 to about 1,200 m/sec.

A plurality of gas injection nozzles 5 are disposed at predetermined positions in the ring-shaped milling chamber 6 such that the nozzles 5 open in a direction somewhat offset from a tangential direction to the milling chamber 6 whereby U air from the gas inlet 3 is injected into the chamber at a supersonic velocity.

With the above mentioned construction, the sintered powder 1 from the hopper 2 undergoes pulverization promoted by mutual impingement of particles in the supersonic gas flow or impingement of fast particles against partition walls of the milling chamber 6.

The thus finely comminuted sintered powder then passes from the milling chamber 6 to a cyclone 7 and moves down in the cyclone 7 while being classified along high velocity swirl flows.

The sintered powder floats and swirls in the cyclone 7, while an extremely fine powder fraction is discharged to the exterior through an outlet duct 9 along with the inert gas. In turn, fine powder settles on the cyclone bottom. After the supply of the supersonic gas flow is interrupted, the fine powder is removed as magnetic powder by opening a shutter plate 8.

Figure 3:
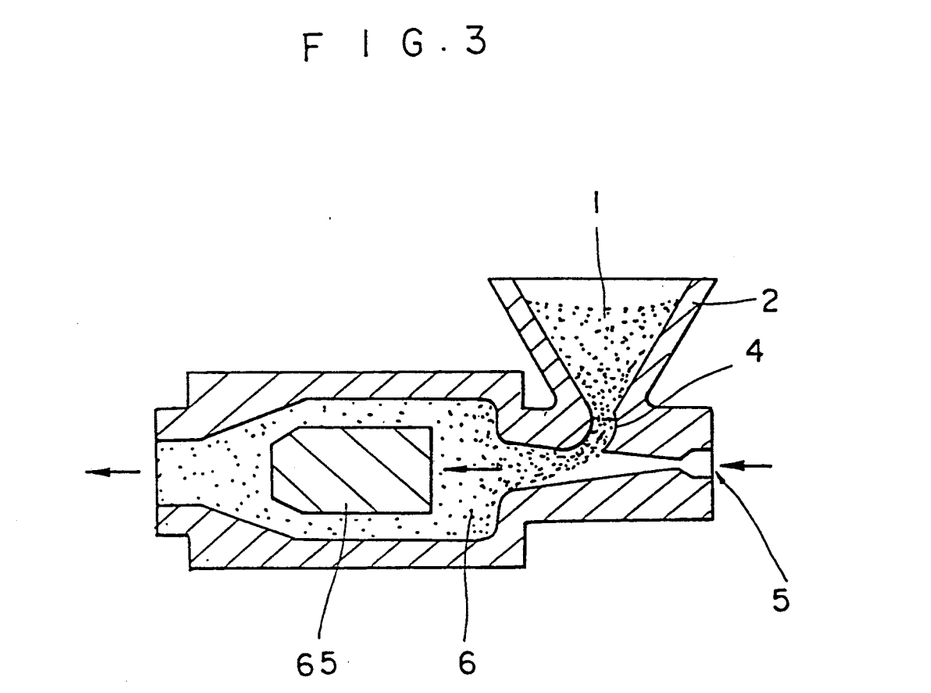

FIG. 3 illustrates another jet mill pulverizing apparatus equipped with a buffle 65 for impingement in a milling chamber 6.

Thereafter, the powder is annealed in air at 300° to 1,000° C. for about 2 to about 4 hours for stress removal.

The powder is further disintegrated if desired, yielding a magnetic powder having the above-mentioned particle size distribution.

In the practice of the invention, milling after the sintering procedure may be wet milling using an attritor, ball mill, Pearl Mill ® or other suitable mill.

In this case, milling is followed by surface etching, drying, annealing, and disintegration.

Suitable etchants such as hydrochloric acid are used for etching. The powder is dipped and agitated in the etchant at 20° to 40° C. for about 10 to about 30 minutes, thereby removing the Fe mainly introduced from the milling medium.

This etching is effective in the case of wet milling, but unnecessary in the case of jet milling.

The magnetic powder of the invention prepared in this way has a coercive force Hc of about 3 to 15 kOe, a saturation magnetization $\sigma s$ of about 5 to 20 emu/g, a residual magnetization $\sigma r$ of about 4 to 16 emu/g, a Tc of about 100° to 180° C., and a squareness ratio of at least 0.6, preferably at least 0.7, more preferably 0.7 to 0.9.

Only a minimal variation occurs in these properties.

In particular, an increase of Hc by 1.0 to 2.5 kOe, a lowering of Tc by 10° to 30° C., and an increase of squareness ratio by 0.1 to 0.3 can be achieved by controlling d as previously defined.

By approximating the Cs/Ci to unity (1), a 5–15% increase of Hc, a 5–15% increase of squareness ratio, and a 5–10% lowering of Tc are achieved as compared with their values obtained for a Cs/Ci in excess of 1.1.

The magnetic recording medium of the present invention comprises a magnetic layer containing the above-mentioned magnetic powder and a binder.

Dispersion of magnetic powder in a binder has the benefits of enhanced flexibility and ease of handling.

The binders used herein include various well-known thermoplastic resins, thermosetting resins, radiation curable resins, reactive resins and other resins.

The binder and the magnetic powder of the invention may be contained in a weight ratio of from 9:1 to 1:9, especially from 3:1 to 1:3.

The binder and the magnetic powder each may be used as a mixture of two types and if desired, another magnetic powder may be used in combination.

In addition, the magnetic layer may contain a well-known dispersant, abrasive, coloring agent, lubricant or the like.

The magnetic layer ay be about 0.5 to about 30 μm thick.

It is to be noted that a plurality of magnetic layers may be placed one on another.

As substrates used herein, various well-known resins, metals, glass and the like are applicable.

It is to be noted that an undercoat layer, surface layer, intermediate layer, or backcoat layer may be formed depending on a particular application of the medium.

The magnetic recording medium of the above-mentioned construction has a Hc of about 3 to 15 kOe, a cm of about 2 to 10 emu/g, and a squareness ratio of about 0.7 to 0.9.

Using such a magnetic recording medium, magnetic recording is carried out by the following methods.

A first method is thermomagnetic recording or magneto-optical recording.

In this method, recording may be carried out in a conventional manner by heating the magnetic layer at a temperature equal to or higher than the Curie temperature of the magnetic powder, for example, at 120° to 180° C., using laser light or a heating head.

A second method is thermomagnetic duplication.

In this method, signal duplication may be carried out by placing the magnetic layer in contact with a master magnetic layer of $\gamma$-$Fe_2O_3$ or the like carrying signals and heating the magnetic layer to the above-defined temperature.

In either case, a squareness ratio of at least 0.6 is achieved, input/output properties are excellent, and the frequency response of duplicated or recorded signals is very flat. Outputs experience no change with variations in heating temperature and have a high S/N ratio.

EXAMPLE

Examples of the present invention are given below by way of illustration.

EXAMPLE 1

Stock materials were weighed, calcined in air at 1,300° C. for two hours, pulverized to a particle size of 5 to 15 μm, then molded, and fired in air at 1,420° C. for two hours, yielding $SrO \cdot 5.6(Fe_{6/6}Cr_{4.5/6}Al_{1.5/6})$.

The sintered material was crushed to a size of 5 μm or finer in a vibratory mill.

The material was further comminuted by means of the jet mill 10 shown in FIG. 2.

The mill had a nozzle output diameter of 10 mm and a nozzle inlet diameter of 5 mm, and the feed gas had a flow velocity of 1,000 m/sec.

Subsequent annealing in air at 500° C. for two hours and disintegration resulted in Magnetic Powder 1 of the invention.

An SEM image of the magnetic powder was subjected to image analysis to determine the maximum particle sizes of particles, from which the number average particle size $\bar{d}$ was calculated to be 1.1 μm.

A number of particles corresponding to 72% of the entire particles had a particle size within the range of from $0.5\bar{d}$ to $1.5\bar{d}$.

The Fe amount was counted by ESCA with ion etching to find a Cs/Ci of from 0.95 to 1.05.

Magnetic Powder 1 had the following properties.

| | |
|---|---|
| Tc | 130° C. |
| Hc | 11.0 kOe |
| σs | 6.0 emu/g |
| σr | 5.1 emu/g |
| Squareness ratio | 0.70 |

The following composition was prepared using the magnetic powder.

| | |
|---|---|
| Magnetic powder | 120 parts by weight |
| Carbon black | 6 parts by weight |
| Lecithin | 2 parts by weight |
| Nitrocellulose (H-½ sec. chips of 70% nitrocellulose with 30% isopropyl alcohol replaced by 30% VAGH vinyl chloride/vinyl acetate copolymer manufactured by UCC) | 15 parts by weight |
| Methyl ethyl ketone | 50 parts by weight |
| Methyl isobutyl ketone | 50 parts by weight |

Among these ingredients, the nitrocellulose chips, lecithin, methyl ethyl ketone, and methyl isobutyl ketone were thoroughly dissolved by means of an agitator, and thereafter the solution was poured into a ball mill along with the magnetic powder was fully wetted.

A solution was prepared by fully mixing the following ingredients.

| | |
|---|---|
| Polyurethane resin (Esten 5701 by B. F. Goodrich Co.) | 15 parts by weight |
| Methyl ethyl ketone | 200 parts by weight |
| Tetrahydrofuran | 100 parts by weight |
| Lubricant (butyl myristate) | 3 parts by weight |

This solution was poured into the ball mill which contained the pre-mixed composition. The contents were again mixed for dispersion for 42 hours.

At the end of dispersion, 5 parts by weight of an isocyanate compound capable of reacting and crosslinking with functional groups, mainly hydroxyl groups of the binder in the magnetic coating composition (Desmodur L by Bayer A. G.) was added to the ball mill, followed by mixing for a further 20 minutes.

This magnetic coating composition had a satisfactory pot life.

The magnetic coating composition thus obtained was coated on a polyester film of 20 μm thick to form a magnetic tape, which was surface treated and then maintained at 80° C. for 48 hours to promote thermosetting reaction of the magnetic coating.

The tape was slit by a slitter.

The magnetic layer had a thickness of 10 μm.

The tape showed squareness ratio 0.8, Hc 10 kOe, Br 2.7 emu/g, and a steep thermal demagnetization curve.

Recording and reproducing operations were conducted on the tape by heating it at 170° C. using a heating head.

S/N ratio was 30.

The heating temperature was varied over the range of 170°±10° C. during the recording and reproducing operations by changing the current to the heating head, finding a variation of reproduced output to be up to 10%, that is, a minimal output variation.

The tape was repeatedly operated 10,000 cycles by conducting thermal erasing after the recording and reproducing operations, finding a drop of reproduced output to be up to 5%.

For comparison purposes, a magnetic tape was similarly prepared by replacing Magnetic Powder 1 of Example 1 by $Nd_{1.6}Pr_{0.4}Fe_{12}Mn_2B$ alloy having the following properties.

| | |
|---|---|
| Average particle size | 2 μm |
| Hc | 4.1 kOe |
| σs | 28 emu/g |
| Tc | 140° C. |

The same test as in Example 1 was carried out except that the heating temperature was changed to 170° C. An output variation in excess of 10% resulted from a heating temperature variation of ±10° C. and an output S/N ratio was 20 or lower.

EXAMPLE 2

A commercially available $\gamma$-$Fe_2O_3$ audio tape (manufactured by TDK Corporation) was used as a master tape in which signals of 60 Hz to 10 kHz were recorded.

Thermomagnetic duplication was carried out between the master tape and the tape of Example 1 by heating at 180° C. while running at 2.5 m/sec.

The ratio of the output of the duplicating tape to the output of the master tape is shown in Table 1 below. In this test, the master tape was recorded such that outputs became flat over 100 Hz to 10 kHz, and output ratios at respective frequencies were calculated based on the output of each duplicating tape at 100 Hz assumed to be 0 dB.

TABLE 1

| | Invention (dB) | Comparison (dB) |
|---|---|---|
| 100 Hz | 0 | 0 |
| 1 kHz | −1 | −10 |
| 10 kHz | −1 | −5 |

For comparison purposes, the results of a $CrO_2$ tape are also shown in Table 1.

The $CrO_2$ magnetic powder used herein had average particle size 0.5 μm, Hc 400 Oe, σs 80 emu/g, and σr 50 emu/g.

The benefits of the invention are evident from the results shown in Table 1.

EXAMPLE 3

In Example 1, pulverization was carried out by means of an attritor instead of the jet mill, followed by filtration, etching, and drying.

The etchant used was hydrochloric acid. The magnetic powder was surface etched by dipping and agitating the powder in the etchant at 25° C. for 30 minutes. Drying was at 80° C. in air.

This Magnetic Powder 2 had the following properties.

| | |
|---|---|
| $\bar{d}$ | 1.2 μm |
| $0.5\bar{d}-1.5\bar{d}$ | 60% |
| Cs/Ci | 1 ± 0.05 |
| Tc | 130° C. |
| Hc | 9.2 kOe |
| σs | 5.9 emu/g |
| σr | 4.8 emu/g |
| Squareness ratio | 0.63 |

For Magnetic Powder 2, a tape was prepared by the same procedure as for Magnetic Powder 1 and subjected to thermomagnetic duplication and thermomagnetic recording, obtaining equivalent results to those of Examples 1 and 2.

Next, Magnetic Powder 3 was prepared by the same procedure as in the manufacture of Magnetic Powder 2 except that etching was omitted.

Magnetic Powder 3 had the following properties.

| | |
|---|---|
| $\bar{d}$ | 1.3 μm |
| $0.5\bar{d}-1.5\bar{d}$ | 48% |
| Cs/Ci | >1.1 |
| Tc | 160° C. |
| Hc | 7.5 kOe |
| σs | 6.0 emu/g |
| σr | 4.9 emu/g |
| Squareness ratio | 0.51 |

It is seen that the magnetic properties of Magnetic Powder 2 were improved over those of Magnetic Powder 3.

For Magnetic Powder 3, a tape was prepared by the same procedure as for Magnetic Powder 1, finding that thermomagnetic duplication and thermomagnetic recording were possible.

However, squareness ratio was low and input/output properties were relatively poor.

EXAMPLE 4

Magnetic tapes were prepared by the same procedure as in Example 1 except that Magnetic Powder 1 was replaced by the following ones.

| Magnetic Powder 4: SrO·5.8(Fe$_{6/6}$Al$_{6/6}$O$_3$) | |
|---|---|
| $\bar{d}$ | 1.8 μm |
| $0.5\bar{d}-1.5\bar{d}$ | 71% |
| Cs/Ci | 1 ± 0.05 |
| Hc | 12.3 kOe |
| σs | 4.1 emu/g |
| Tc | 160° C. |
| Squareness ratio | 0.73 |

| Magnetic Powder 5: SrO·5.6(Fe$_{5/6}$Cr$_{7/6}$O$_3$) | |
|---|---|
| $\bar{d}$ | 2.3 μm |
| $0.5\bar{d}-1.5\bar{d}$ | 73% |
| Cs/Ci | 1 ± 0.05 |
| Hc | 8.6 kOe |
| σos | 5.2 emu/g |
| Tc | 140° C. |
| Squareness ratio | 0.72 |

| Magnetic Powder 6: SrO·5.6(Fe$_{6/6}$Ga$_{3/6}$Cr$_{2/6}$Al$_{1/6}$O$_3$) | |
|---|---|
| $\bar{d}$ | 1.5 μm |
| $0.5\bar{d}-1.5\bar{d}$ | 71% |
| Cs/Ci | 1 ± 0.05 |
| Hc | 7.2 kOe |
| σs | 6.2 emu/g |
| Tc | 110° C. |
| Squareness ratio | 0.70 |

For these magnetic powders, thermomagnetic duplicating and thermomagnetic recording operations were carried out as in Examples 1 and 2, obtaining equivalent results to those of Examples 1 and 2.

EXAMPLE 5

Magnetic Powder 7 having d=1.3 μm was prepared by weighing stock materials, sintering at 1,450° C. to produce $$BaO·5.8(Fe_{6.5/6}Ga_{3/6}Cr_{2.5/6}O_3),$$

and milling the sintered material as in Example 1.

Magnetic Powder 7 had the following properties.

| | |
|---|---|
| $\bar{d}$ | 1.4 μm |
| $0.5\bar{d}-1.5\bar{d}$ | 71% |
| Cs/Ci | 1 ± 0.05 |
| Hc | 5 kOe |
| σs | 5.5 emu/g |
| Tc | 120° C. |
| Squareness ratio | 0.74 |

For Magnetic Powder 7, a medium was prepared by the same procedure as in Examples 1 and 2 and subjected to thermomagnetic duplication and thermomagnetic recording, obtaining equivalent results to those of Examples 1 and 2.

EXAMPLE 6

The following Magnetic Powders 8 to 12 were prepared as in Example 5.

| Magnetic Powder 8: BaO·5.8(Fe$_{7/6}$Ga$_{3/6}$Cr$_{2/6}$O$_4$) | |
|---|---|
| $\bar{d}$ | 1.2 μm |
| $0.5\bar{d}-1.5\bar{d}$ | 70% |
| Cs/Ci | 1 ± 0.05 |
| Hc | 6 kOe |
| σs | 8.5 emu/g |
| Tc | 140° C. |
| Squareness ratio | 0.74 |

| Magnetic Powder 9: BaO·5.8(Fe$_{7.5/6}$Cr$_{4.5/6}$O$_3$) | |
|---|---|
| $\bar{d}$ | 1.2 μm |
| $0.5\bar{d}-1.5\bar{d}$ | 71% |
| Cs/C | 1 ± 0.05 |
| Hc | 7.1 kOe |
| σs | 8.1 emu/g |
| Tc | 180° C. |
| Squareness ratio | 0.70 |

| Magnetic Powder 10: BaO·5.8(Fe$_{4/6}$Cr$_{3/6}$Al$_{5/6}$O$_4$) | |
|---|---|
| $\bar{d}$ | 1.2 μm |
| $0.5\bar{d}-1.5\bar{d}$ | 71% |
| Cs/Ci | 1 ± 0.05 |
| Hc | 10 kOe |
| σs | 4.1 emu/g |
| Tc | 130° C. |

-continued

| Squareness ratio | 0.73 |
|---|---|
| Magnetic Powder 11: BaO.5.6(Fe$_{4/6}$Al$_{8/6}$O$_4$) | |
| $\bar{d}$ | 1.2 μm |
| 0.5$\bar{d}$–1.5$\bar{d}$ | 72% |
| Cs/Ci | 1 ± 0.05 |
| Hc | 11 kOe |
| σs | 4.1 emu/g |
| Tc | 180° C. |
| Squareness ratio | 0.73 |
| Magnetic Powder 12: BaO.5.6(Fe$_{5.5/6}$Ga$_{1/6}$Cr$_{4/6}$Al$_{1.5/6}$O$_4$) | |
| $\bar{d}$ | 1.1 μm |
| 0.5$\bar{d}$–1.5$\bar{d}$ | 70% |
| Cs/Ci | 1 ± 0.05 |
| Hc | 7.2 kOe |
| σs | 7.2 emu/g |
| Tc | 140° C. |
| Squareness ratio | 0.75 |

For Magnetic Powders 8 to 12, media were prepared by the same procedure as in Examples 1 and 2 and subjected to thermomagnetic duplication and thermomagnetic recording, obtaining equivalent results to those of Examples 1 and 2.

INDUSTRIAL APPLICABILITY

The present invention provides a magnetic layer which has a high Hc and once recorded, cannot be easily erased.

In addition, squareness ratio is high, and thermomagnetic duplication and thermomagnetic recording can be advantageously conducted at 100° to 180° C., with outputs having a satisfactory frequency response.

More particularly, the magnetic powder of the invention requires lower heating temperatures upon thermomagnetic duplication because it has as high coercive force as the prior art well-known high coercive force materials such as MnBi, but a lower Curie point than the MnBi and other high coercive force materials.

Even when a substrate material used is a resin, the substrate undergoes not thermal distortion, ensuring a satisfactory output waveform.

In addition, squareness ratio is outstandingly high and a thermal demagnetization curve is outstandingly steep.

Resistance against variations of the heating temperature upon recording by thermal duplication is high, with a minimal variation in reproduced outputs. The reproduced outputs have a very high S/N ratio.

Further, stability with time is high, and the binder used in the magnetic layer formation may be selected from a wider variety of compositions.

Also, the magnetic coating composition has a long pot life with an increased productivity.

Still further, the magnetic powder has high affinity to the binder so that the coating is well durable.

Furthermore, the life of a heating head is increased.

We claim:

1. A thermomagnetic recording medium for use in recording using a magnetic head comprising a magnetic layer containing a magnetic powder having a Curie temperature Tc up to 180° C., a coercive force Hc of at least 6 kOe, and a composition of the following formula:

$$MeO\cdot n[Fe_{2-x-y-z}Ga_xCr_yAl_zO_3]$$

wherein Me is Sr or Sr and at least one element selected from the group consisting of Ba, Pb, and Ca, $4.5 \leq n \leq 6$, $x \geq 0$, $y > 0$, $z \geq 0$, $x/3 + y/4 + z/6 \geq 1/6$, and $x/6 + y/10 + z/11 \leq 1/6$, in a binder.

2. The magnetic recording medium of claim 1 wherein the magnetic powder has an average particle size $\bar{d}$, the number of those particles having a particle size of from 0.5$\bar{d}$ to 1.5$\bar{d}$ is at least 65% of the entire particles.

3. The magnetic recording medium of claim 2 wherein the Fe content on the particle surface is substantially equal to the Fe content in the particle interior.

4. The magnetic recording medium of claim 3, wherein the magnetic powder has a Cs/Ci in the range of 0.9 to 1.1.

5. A method for thermomagnetic recording on a thermomagnetic recording medium comprising a magnetic layer containing a magnetic powder having a Curie temperature Tc up to 180° C., a coercive force Hc of at least 6 kOe, and a composition of the following formula:

$$MeO\cdot n[Fe_{2-x-y-z}Ga_xCr_yAl_zO_3]$$

wherein Me is at least one element selected from the group consisting of Ba, Sr, Pb, and Ca, $4.5 \leq n \leq 6$, $x \geq 0$, $y \geq 0$, $z \geq 0$, $x/3 + y/4 + z/6 \geq 1/6$, and $x/6 + y/10 + z/11 \leq 1/6$, in a binder
said method comprising the step of carrying out thermomagnetic recording by heating said magnetic layer at 100° to 180° C. using a magnetic head.

6. The thermomagnetic recording method of claim 5 wherein the magnetic powder has an average particle size $\bar{d}$, the number of those particles having a particle size of from 0.5$\bar{d}$ to 1.5$\bar{d}$ is at least 65% of the entire particles.

7. The thermomagnetic recording method of claim 5 or 6 where the Fe content on the particle surface is substantially equal to the Fe content in the particle interior.

8. The thermomagnetic recording method of claim 7, wherein the magnetic powder has a Cs/Ci in the range of 0.9 to 1.1.

* * * * *

UNITED STATES PATENT AND TRADEMARK OFFICE
CERTIFICATE OF CORRECTION

PATENT NO. : 5,229,219
DATED : JULY 20, 1993
INVENTOR(S) : HIDEHARU MORO ET AL

It is certified that error appears in the above-identified patent and that said Letters Patent is hereby corrected as shown below:

Column 14, line 36, delete "Sr"

line 36, delete "Sr".

Signed and Sealed this

Fourteenth Day of June, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,229,219
DATED : July 20, 1993
INVENTOR(S) : Hideharu MORO, et al.

It is certified that error appears in the above-indentified patent and that said Letters Patent is hereby corrected as shown below:

Column 14, Line 35, before "at least" insert --Sr or Sr and--

Column 14, Line 36, delete "Sr"

This certificate supersedes Certificate of Correction issued June 14, 1994.

Signed and Sealed this

Fourth Day of October, 1994

Attest:

BRUCE LEHMAN

Attesting Officer     Commissioner of Patents and Trademarks